(12) United States Patent
Greenwood et al.

(10) Patent No.: US 10,717,032 B2
(45) Date of Patent: Jul. 21, 2020

(54) EXPANDED METAL FILTERS

(75) Inventors: George Greenwood, Tiverton, RI (US); Michael McCarthy, Lincoln, RI (US); Richard Pfefferle, North Smithfield, RI (US)

(73) Assignee: ACS Industries, Inc., Lincoln, RI (US)

( * ) Notice: Subject to any disclaimer, the term of this patent is extended or adjusted under 35 U.S.C. 154(b) by 0 days.

(21) Appl. No.: 12/407,204

(22) Filed: Mar. 19, 2009

(65) Prior Publication Data

US 2009/0184504 A1 Jul. 23, 2009
US 2018/0304186 A2 Oct. 25, 2018

Related U.S. Application Data

(63) Continuation-in-part of application No. PCT/US2007/078971, filed on Sep. 20, 2007.
(Continued)

(51) Int. Cl.
*B01D 46/24* (2006.01)
*B21D 31/04* (2006.01)
*B60R 21/26* (2011.01)

(52) U.S. Cl.
CPC ............ *B01D 46/24* (2013.01); *B21D 31/04* (2013.01); *B01D 2279/10* (2013.01);
(Continued)

(58) Field of Classification Search
USPC ................ 280/736, 741, 742; 102/530, 531; 29/896.62, 525.14, 557
See application file for complete search history.

(56) References Cited

U.S. PATENT DOCUMENTS

| | | | |
|---|---|---|---|
| 2,271,187 A | | 9/1939 | Fortescue et al. |
| 2,296,566 A | * | 9/1942 | Neumann ...................... 96/392 |

(Continued)

FOREIGN PATENT DOCUMENTS

| | | |
|---|---|---|
| CN | 1078181 A | 10/1993 |
| CN | 1156040 C | 6/2004 |

(Continued)

OTHER PUBLICATIONS

English translation (by computer) of JP06-170129.
(Continued)

*Primary Examiner* — Keith J Frisby
(74) *Attorney, Agent, or Firm* — Maurice M. Klee

(57) ABSTRACT

Expanded metal sheets are used to produce tubular filters. The expanded metal sheet has a multiplicity of rows of openings arranged to reduce nesting when the sheet is rolled on itself. In particular, the pitch between the rows of openings, the sizes of the openings, or both the pitch between the rows of openings and the sizes of the openings are varied to reduce nesting when the expanded metal sheet is rolled on itself. The filters can include external circumferential grooves, rounded corners produced by a point loading process, textured surfaces between openings, and/or torturous internal paths produced by non-perforated areas of an expanded metal sheet. The expanded metal sheet can be composed of carbon steel coated with a material having a higher heat conductivity, e.g., tin. Among other things, the filters can be used in automobile airbag inflators to capture slag and absorb heat produced by the inflator's explosive charge.

15 Claims, 9 Drawing Sheets

Related U.S. Application Data

(60) Provisional application No. 60/846,381, filed on Sep. 21, 2006, provisional application No. 60/851,719, filed on Oct. 14, 2006.

(52) U.S. Cl.
CPC ............... *B60R 2021/26011* (2013.01); *Y10T 29/49604* (2015.01); *Y10T 428/13* (2015.01)

(56) References Cited

U.S. PATENT DOCUMENTS

| | | | |
|---|---|---|---|
| 2,830,359 A | 5/1954 | Reinshagen | |
| 3,607,411 A | 9/1971 | Brownrigg | |
| 4,119,701 A | 10/1978 | Fedor et al. | |
| 4,265,647 A * | 5/1981 | Donachiue | 55/315 |
| 4,414,902 A | 11/1983 | Strasser et al. | |
| 4,486,927 A | 12/1984 | Hunter et al. | |
| 4,507,948 A | 4/1985 | Wallis | |
| 4,567,630 A | 2/1986 | Ishida et al. | |
| 4,604,156 A * | 8/1986 | Raley et al. | 156/294 |
| 5,100,171 A | 3/1992 | Faigle et al. | |
| 5,122,270 A * | 6/1992 | Ruger et al. | 210/282 |
| 5,230,726 A | 7/1993 | Smith et al. | |
| 5,308,370 A | 5/1994 | Kraft et al. | |
| 5,360,232 A | 11/1994 | Lowe et al. | |
| 5,407,120 A | 4/1995 | Philpot | |
| 5,500,271 A | 3/1996 | Pasch et al. | |
| 5,503,806 A | 4/1996 | Fulmer et al. | |
| 5,551,724 A | 9/1996 | Armstrong, III et al. | |
| 5,589,067 A * | 12/1996 | Rice | 210/493.5 |
| 5,665,131 A | 9/1997 | Hock et al. | |
| 5,673,483 A | 10/1997 | Hock et al. | |
| 5,743,560 A | 4/1998 | Jackson et al. | |
| 5,763,820 A | 6/1998 | Philpot et al. | |
| 5,829,785 A | 11/1998 | Jordan et al. | |
| 5,845,934 A * | 12/1998 | Armstrong, III | 280/742 |
| 5,855,635 A * | 1/1999 | Rice | 55/486 |
| 6,065,774 A | 5/2000 | Cabrera | |
| 6,095,559 A | 8/2000 | Smith et al. | |
| 6,123,359 A | 9/2000 | Cabrera et al. | |
| 6,202,271 B1 | 3/2001 | Goda et al. | |
| 6,485,051 B1 | 11/2002 | Taguchi et al. | |
| 6,629,016 B1 | 9/2003 | Smith | |
| 6,846,013 B2 | 1/2005 | Smith | |
| 6,857,188 B2 | 2/2005 | Maus | |
| 6,886,855 B2 | 5/2005 | Cheal et al. | |
| 7,267,365 B2 | 9/2007 | Quioc | |
| 7,341,615 B2 * | 3/2008 | Hardenburg | 55/525 |
| 7,503,354 B2 | 3/2009 | Amano | |
| 7,823,919 B2 | 11/2010 | Jackson et al. | |
| 2003/0094799 A1 | 5/2003 | Smith | |
| 2003/0222443 A1 | 12/2003 | Cheal et al. | |
| 2005/0056977 A1 | 3/2005 | Figoutz et al. | |
| 2005/0155923 A1* | 7/2005 | Diemer et al. | 210/345 |
| 2005/0161923 A1 | 7/2005 | Hirooka et al. | |
| 2005/0161925 A1 | 7/2005 | Blackburn | |
| 2005/0184497 A1 | 8/2005 | Miyaji et al. | |
| 2006/0037298 A1* | 2/2006 | Greenwood | B01D 39/12 55/525 |
| 2007/0013179 A1 | 1/2007 | Numoto et al. | |
| 2007/0062168 A1 | 3/2007 | Adamini et al. | |
| 2007/0122590 A1 | 5/2007 | Lalvani | |
| 2008/0156216 A1 | 7/2008 | Yoshida et al. | |
| 2009/0261562 A1 | 10/2009 | Clark et al. | |
| 2009/0295132 A1 | 12/2009 | Jackson et al. | |

FOREIGN PATENT DOCUMENTS

| | | |
|---|---|---|
| EP | 0 684 063 A2 | 11/1995 |
| EP | 0 800 964 A2 | 10/1997 |
| EP | 1008497 A1 | 6/2000 |
| EP | 1 127 753 A1 | 8/2001 |
| JP | 33-000879 Y1 | 1/1958 |
| JP | 51-105967 A | 9/1976 |
| JP | 53-142368 | 12/1978 |
| JP | 58-032529 A | 2/1983 |
| JP | 61-159232 | 7/1986 |
| JP | 05-285578 | 11/1993 |
| JP | 06-170129 | 6/1994 |
| JP | 06-255441 | 9/1994 |
| JP | 07-061313 A | 3/1995 |
| JP | 07-285412 | 10/1995 |
| JP | 08-200036 * 8/1996 ............... F01N 1/04 |
| JP | 08-206513 A | 8/1996 |
| JP | 08-206514 A | 8/1996 |
| JP | 10-263336 | 10/1998 |
| JP | 11043007 A | 2/1999 |
| JP | 2000-127888 | 5/2000 |
| JP | 2000-198409 A | 7/2000 |
| JP | 2002-249017 | 9/2002 |
| JP | 2003-080012 | 3/2003 |
| JP | 2005-178643 | 7/2005 |
| JP | 2005-246160 | 9/2005 |
| JP | 2005-313121 | 11/2005 |
| JP | 2008-272618 | 11/2008 |
| JP | 2009-214746 A | 9/2009 |
| WO | WO 96/30105 | 10/1996 |
| WO | WO 2003/057347 | 7/2003 |
| WO | WO 2008/036788 A2 | 3/2008 |

OTHER PUBLICATIONS

English translation (by computer) of JP2000-127888.
English translation (by computer) of JP2002-249017.
English translation (by computer) of JP2003-080012.
English translation (by computer) of JP2005-313121.
Jul. 28, 2011 Office Action in U.S. Appl. No. 12/952,120 (16 pages).
Apr. 30, 2012 Office Action in U.S. Appl. No. 12/952,120 (24 pages).
Express Abandonment of Application Without Prejudice Under 37 CFR 1.138 filed Jul. 27, 2012 in U.S. Appl. No. 12/952,120 (2 pages).
Aug. 2, 2012 Notice of Abandonment in U.S. Appl. No. 12/952,120 (2 pages).
May 29, 2012 Office Action in U.S. Appl. No. 13/232,111 (16 pages).
The New Oxford American Dictionary, 2nd ed., 2005, New York, Oxford University Press, p. 949 and p. 1213.
Kleir et al., "Who Really Made Your Car?" W.E. Upjohn Institute for Employment Research, Kalamazoo, Michigan, 2008, pp. 340-342 and 362-363.
Professional translation of Japanese Patent Publication No. 61-159232.
Professional translation of Japanese Patent Publication No. 53-142368.
Hock et al., U.S. Appl. No. 08/248,939, filed May 25, 1994 entitled "Inflator Filter Made of Wrapped Mesh".
Mar. 29, 2016 Office Action in JP Application No. 2015-79106 and the claims referred to therein (10 pages).
Sep. 17, 2012 Office Action in U.S. Appl. No. 13/232,111 (15 pages).
Feb. 19, 2013 Office Action in U.S. Appl. No. 13/232,111 (14 pages).
Jul. 24, 2013 Office Action in U.S. Appl. No. 13/232,111 (17 pages).
Mar. 31, 2014 Examiner's Answer in U.S. Appl. No. 13/232,111 (8 pages).
Dec. 16, 2016 PTAB Decision in U.S. Appl. No. 13/232,111 (9 pages).

* cited by examiner

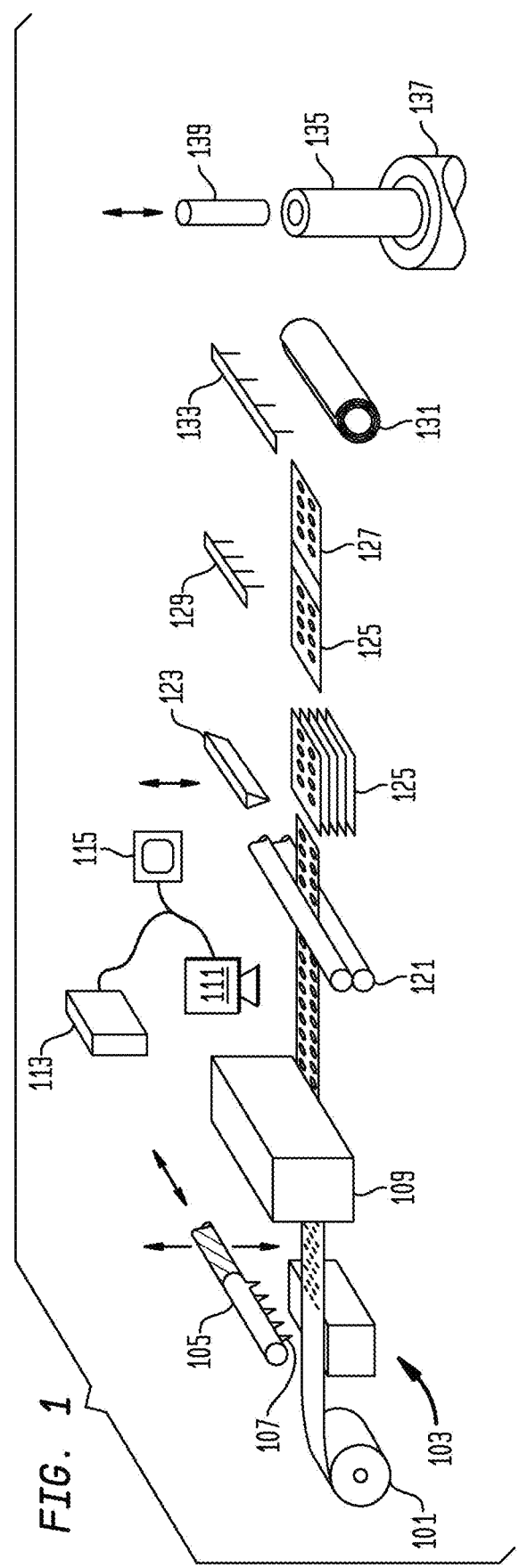

37

EXPANDED METAL FILTERS

CROSS-REFERENCE TO RELATED APPLICATIONS

This application is a continuation-in-part of International Application No. PCT/US2007/078971 filed Sep. 20, 2007, which claims the benefit under 35 USC § 119(e) of U.S. Provisional Application No. 60/846,381 filed Sep. 21, 2006 and U.S. Provisional Application No. 60/851,719 filed Oct. 14, 2006, and which was published in English as WO/2008/036788 on Mar. 27, 2008. The contents of International Application No. PCT/US2007/078971 and U.S. Provisional Applications Nos. 60/846,381 and 60/851,719 are hereby incorporated herein by reference in their entireties.

FIELD

This invention relates to expanded metal sheets having variable sized openings, variable opening pitches, or both variable sized openings and variable opening pitches so that the openings are less likely to align and nest when the sheet is rolled on itself, methods for making the sheets, filters made from the sheets, and methods for making the filters.

BACKGROUND

A. Expanded Metal Sheets

Expanded metal sheets have found a variety of uses, from mats used for fighting fires to filters for automobile airbag inflators. They can be made in a variety of ways. For example, an expanded metal sheet can be made by taking a sheet of metal, puncturing the sheet to produce a multiplicity of slits, and pulling the sheet perpendicular to the direction of the slit to elongate the slit and provide an opening in the sheet. Another common method for making an expanded metal sheet is by piercing and cold forming openings, which are often called "diamonds" because of their final shape. The final length of the sheet, with the accompanying holes, is longer than the original and so it is expanded, as well as the openings formed being expanded.

Thus, although the details will vary depending on the specific process, expanded metal sheets are typically made by using a row of teeth or bits in a punch to produce perforations in the sheet. The side of the sheet facing the punch will have an indentation around the perforation, and the reverse side of the sheet will have a corresponding raised portion, a burr, around the perforation. The regularity of the perforations allows nesting of the perforations when the sheet is stacked, curled, rolled or otherwise placed in overlying relation, and the presence of burrs can lock the structure in a nested configuration. The burr accompanying each perforation also creates an area of increased friction so that the expanded metal sheet may not slide easily, and especially not when in contact with itself when curled or wrapped around a similar sheet.

B. Filters for Automotive Airbag Inflators

Filters for automotive airbag inflators need to satisfy a number of demanding criteria. Such filters serve to capture the extensive debris that is generated when an airbag's explosive charge ignites. This debris can damage the airbag and if released from the airbag can injure occupants of the vehicle in which the airbag deployed. In addition, the debris is often chemically harmful to humans.

To control this debris, filters for automotive airbag inflators need to be highly effective in their filtering function. Yet, they must also allow the gas generated by the explosive charge to quickly reach and inflate the airbag. That is, the filters cannot generate excessive levels of backpressure. Moreover, the filters need to satisfy these conflicting criteria, i.e., effective filtering with low backpressure, in the midst of a strong explosion. Besides these criteria, the filter also serves as a diffuser to attain a more even flow of the expanding gases entering the airbag and as a heat sink to help reduce the temperature of the gases so that they will not harm the airbag or the person being protected by the airbag.

In addition to these considerations, cost is always an issue for a mass-produced item, especially one used in the automotive field. Consequently, there have been continuing and extensive efforts to produce low cost and yet highly effective filters for airbag inflators.

SUMMARY

In accordance with a first aspect, a tubular filter is disclosed comprising an expanded metal sheet having a multiplicity of rows of openings arranged to reduce nesting when the sheet is rolled on itself, the sheet rolled into a tube, and welded to fix the tubular orientation, wherein:

(a) the expanded metal sheet is formed from a larger sheet of metal having a width and an axis;

(b) the expanded metal sheet has long edges formed by the larger sheet of metal and short edges where it has been cut as a portion of the larger sheet;

(c) the openings are formed by forming slits in the larger sheet of metal and stretching the slits in the direction of the axis; and (d) the pitch between the rows of openings, the sizes of the openings, or both the pitch between the rows of openings and the sizes of the openings are varied to reduce nesting when the expanded metal sheet is rolled on itself (e.g., the pitch between rows of openings is varied as a function of the circumference defined by a given portion of the expanded metal sheet in the rolled up filter so that radially adjacent openings do not nest).

In accordance with a second aspect, a method of making a filter is disclosed that includes:

(a) providing a sheet of metal having a width and an axis;

(b) forming slits in the sheet and stretching the slits in the direction of the sheet's axis to form a multiplicity of rows of openings;

(c) cutting a smaller sheet from the sheet produced in step (b);

(d) rolling the smaller sheet of step (c) on itself to form a tube; and (e) securing the tube of step (d) with a weld;

wherein in step (b), the multiplicity of rows of openings are arranged to reduce nesting when the smaller sheet is rolled on itself to form the tube (e.g., the pitch between the rows of openings, the sizes of the openings, or both the pitch between the rows of openings and the sizes of the openings are varied to reduce nesting when the smaller sheet is rolled on itself to form the tube).

In accordance with a third aspect, a tubular filter is disclosed that comprises expanded metal that has been rolled on itself to form a multi-layered tube wherein the expanded metal comprises a multiplicity of openings and includes at least one section that is free of openings, said section producing circumferential flow of gas within the filter.

In accordance with a fourth aspect, a tubular filter is disclosed that comprises expanded metal that has been rolled on itself to form a multi-layered tube having a substantially cylindrical outer surface wherein the expanded metal comprises a multiplicity of openings and the substantially cylindrical outer surface comprises a circumferential groove.

In accordance with a fifth aspect, a tubular filter is disclosed that comprises expanded metal that has been rolled on itself to form a multi-layered tube having a central bore, a substantially cylindrical outer surface, and substantially flat end sections which extend between the central bore and the substantially cylindrical outer surface, wherein the expanded metal comprises a multiplicity of openings and the corners formed by the intersections between the substantially cylindrical outer surface and the substantially flat end sections have been rounded by a point loading process.

In accordance with a sixth aspect, a tubular filter is disclosed that comprises expanded metal that has been rolled on itself to form a multi-layered tube wherein the expanded metal comprises a multiplicity of openings and the surface of the expanded metal between at least some of the openings is texturized so as to reduce laminar flow of gas over the surface.

In accordance with a seventh aspect, a tubular filter is disclosed that comprises expanded metal that has been rolled on itself to form a multi-layered tube wherein the expanded metal comprises a multiplicity of openings and the expanded metal comprises a first metal at least one surface of which is coated with a second metal whose thermal conductivity is at least 25% greater than that of the first metal.

Additional features and advantages of the invention are set forth in the detailed description which follows, and in part will be readily apparent to those skilled in the art from that description or recognized by practicing the invention as described herein.

It is to be understood that the foregoing general description and the following detailed description are merely exemplary of the invention and are intended to provide an overview or framework for understanding the nature and character of the invention as it is claimed.

The accompanying drawings are included to provide a further understanding of the invention, and are incorporated in and constitute a part of this specification. It is to be understood that the various aspects and features of the invention disclosed in the specification and in the drawings can be used in any and all combinations. For example, the third through seventh aspects can be used with filters employing expanded metal sheets which do not have a pitch and/or opening size that varies within a single sheet, e.g., these aspects can be used with filters constructed by welding together individual sheets of expanded metal, where at least some of the individual sheets differ from one another in pitch and/or opening size.

BRIEF DESCRIPTION OF THE DRAWINGS

FIG. 1 is a schematic depiction of an embodiment of making an expanded metal sheet and a filter from the sheet.

FIG. 2 is an end view of a filter according to an embodiment of the disclosure.

FIG. 3A is a sheet having openings on one portion and lacking openings on another, and FIGS. 3B and 3C are tubes formed by rolling the sheet in FIG. 3A.

FIG. 4A is a rolled up expanded metal sheet having two bands of perforations, and FIG. 4B is the article in FIG. 4A with wound wire.

FIG. 10A is not to scale and does not show all of the sections shown in FIGS. 10B and 10D.

Figure 5:
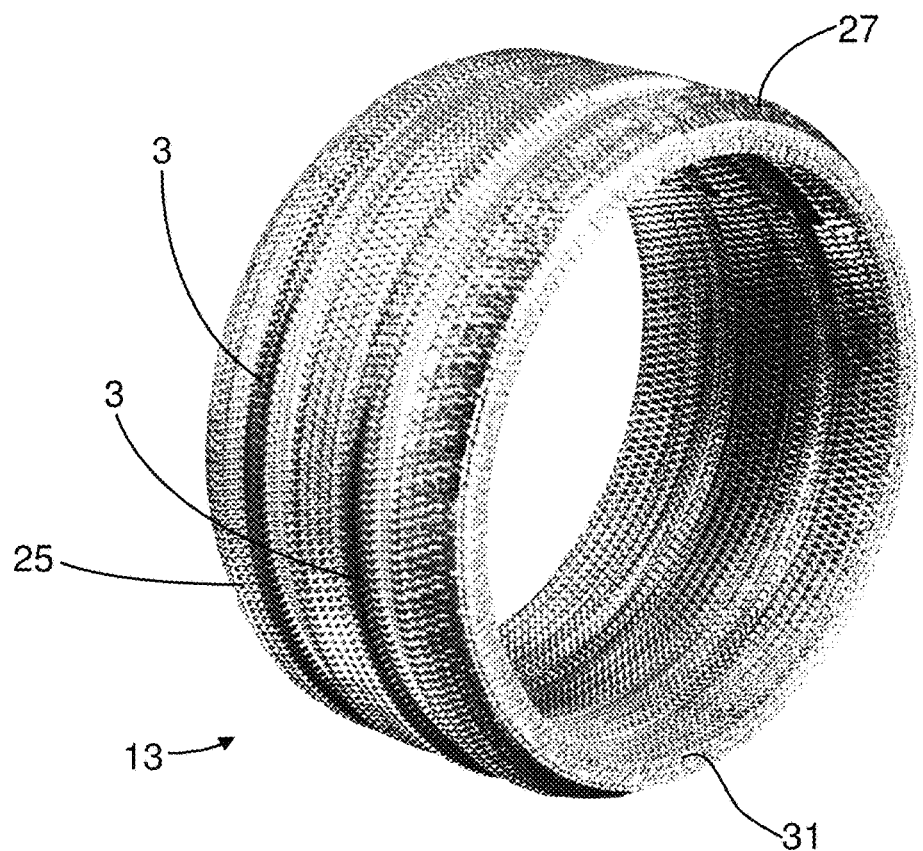
FIG. 5 is a photograph of an expanded metal filter constructed in accordance with certain aspects of the disclosure.

The reference numbers used in the figures correspond to the following:
3 groove
5 expanded metal sheet
7 variable section of expanded metal sheet
9 non-perforated section of expanded metal sheet
13 tubular filter
15 airbag inflator housing
17 aperture of airbag inflator housing
19 rounded corner of airbag inflator housing
21 slag captured by filter
23 igniter port of airbag inflator housing
25 substantially cylindrical outer surface of filter
27 rounded corner of filter
29 chamfered corner of filter
31 substantially flat end section of filter
33 point loading roller
35 groove of point loading roller
37 texturization pattern 39 male roller
41 female roller
43 guide
45 protrusion
47 recess
101 roll of metal strip or sheet
103 press
105 punch
107 teeth or bits
109 stretcher
111 camera
113 computer controller
115 monitor
121 rollers
123 cutter
125 expanded metal sheet
127 expanded metal sheet
129 welder
131 cylinder
133 welder
135 welded mesh cylinder
137 female mold
139 mandrel
201 expanded metal sheet
203 expanded metal sheet
205 weld
207 fabric
209 metal screen
211 weld
301 expanded metal sheet
303 perforated portion of expanded metal sheet
305 non-perforated area of expanded metal sheet
307 area on which wire is wound
309 wire winding

DETAILED DESCRIPTION OF THE PREFERRED EMBODIMENT

A. Expanded Metal Filters and Methods for Making Such Filters

The following discussion is primarily in terms of filters for automotive (vehicle) airbag inflators (also known as "pyrotechnic airbag inflators," "slag filters," or "coolants"), it being understood that the methods and apparatus disclosed herein are also applicable to other types of filters such as filters for oil, air, and other liquids and gases, including cleanable filters for these applications. As automotive airbag inflators are known in the art, details are omitted so as to not obscure the description of the example embodiments.

As discussed above, in certain aspects, this disclosure is for (i) filters made from variable pitch and/or variable opening expanded metal sheets and (ii) methods for making such filters. The sheets can have different spacings between adjacent rows of openings and can, for example, be made by varying the rate at which the sheet is fed through the manufacturing equipment, the rate of punching, and/or the amount of stretching. In particular, in one embodiment, the disclosure provides an expanded metal sheet having a multiplicity of rows of openings wherein the spacing between adjacent rows is not constant.

In one aspect, the disclosure provides an expanded metal sheet wherein a row of perforations is indexed perpendicularly with respect to the length of the sheet and with respect to at least one other row of perforations. In another aspect, an expanded metal sheet is provided that has been flattened to eliminate protrusions (and depressions) caused by the perforation process and to produce a sheet having smoother sides. For many applications, such flattening is not required but it can be useful in connection with, for example, calibrating opening sizes.

In terms of production methods, in yet another embodiment, the disclosure provides a method for making a sheet having variably spaced perforations by indexing the punching tool perpendicularly to the (longitudinal) direction of travel of the sheet. This indexing is, of course, in addition to the conventional indexing used in making expanded metal products in which the perforations in a given row are located at the midpoints of the perforations of the preceding row. In another embodiment the disclosure provides a method for making an expanded metal sheet by (a) feeding a length of metal sheet by discrete steps along the length of the sheet, (b) perforating to form a row of perforations to produce a perforated sheet, and (c) stretching the perforated sheet longitudinally causing the perforations to elongate into openings and produce an expanded metal sheet, wherein the feeding results in a variable spacing between the rows of perforations.

The disclosure also provides an automobile airbag inflator filter comprising an expanded metal sheet having a multiplicity of rows of openings, the sheet rolled into a cylinder, and secured with a weld, the spacing between adjacent rows of openings varying between different adjacent rows.

Nesting in a metal filter is reduced by using a variable pitch expanded metal sheet having different spacings between adjacent rows of openings. Such a filter is made by varying the rate at which the sheet is fed through the equipment, the rate of punching, the amount of stretching, and/or the amount by the which sheet is optionally flattened. Nesting can also be reduced by transversely indexing the punch, using different punch sizes on multiple punches, or combinations of these techniques. The filter can be wire wrapped to enhance its strength.

With reference to FIG. 1, the manufacture of an expanded metal sheet according to certain aspects of this disclosure starts with a roll of metal strip or sheet 101 (for example, about nine inches wide, which can be cut down to six inches for making filters for passenger airbags and to about 1.5 inches for driver airbags, although any width can be used depending on the equipment). For filters for airbag inflators, stainless steel, such as SS304, 309, 310, 409, 410, or 430 can be used. Carbon steel from C1006 to C1008 is often preferred for various applications. Also, as discussed below, carbon steel coated with a second metal having a higher conductivity, e.g., tin, can be advantageous for some applications. Depending on the environment in which the expanded metal is used, other metal compositions available in a sheet form can be used.

The sheet is fed first to a press 103 in which a punch 105 having a number of teeth or bits 107 is moved into the sheet so that the teeth perforate the sheet and then the punch is removed, just as in a stamping operation. The geometry of the bits, which are preferably identical to each other, is preferably such that a slit is formed in the sheet. Depending on the geometry of the bit, the depth of penetration of the bit will determine the length of the slit formed; the deeper the penetration, the longer the slit, and thus the more open the final structure can be after stretching. For airbag inflator filters, the opening is made to a size based on the airbag manufacturer's specifications for the open area of the sheet, the porosity of the sheet, or other parameter(s) required for the filter.

The sheet is advanced preferably by a servo motor (not shown) or other mechanism whereby the longitudinal advance of the sheet can be precisely controlled. The advance of the sheet is preferably in discrete steps so that the sheet is stationary when punched. Although not preferred, a roller with teeth can be used in a continuously moved sheet.

Figure 16:
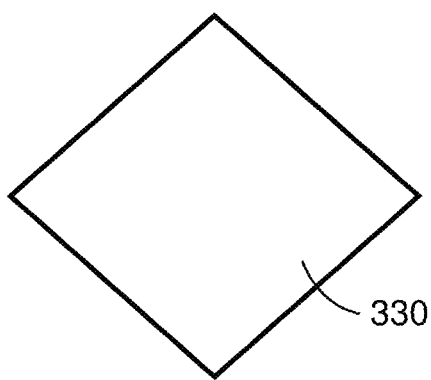
FIG. 16 is a schematic drawing of a diamond-shaped opening of an expanded metal sheet.
Figure 17:
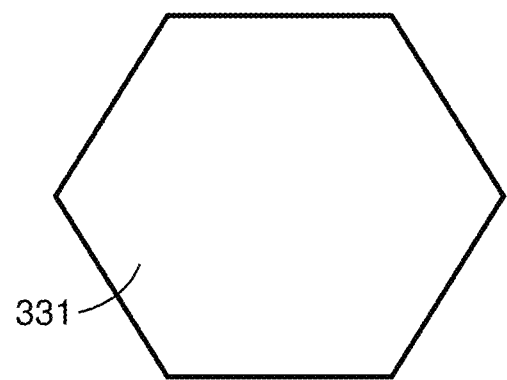
FIG. 17 is a schematic drawing of a hexagonal-shaped opening of an expanded metal sheet.

The perforated sheet produced in the press is then fed to a stretcher 109 in which differential rollers stretch the perforated sheet in the axial direction (that is, along the direction of travel) so that the slits are opened into diamond-shaped holes. (Of course, a hexagonal bit can be used to make hexagonal openings, or other bit geometries, can be used, but slits formed into diamonds is the most common shape. See FIGS. 16 and 17 which show idealized diamond-shaped and hexagonal-shaped openings 330 and 331, respectively.)

Although slitting and stretching can be performed as separate operations, when fine patterns are to be formed, it is often preferable to produce the expanded metal sheets by performing slitting and stretching with the same teeth in the same motion. During this operation, the material hangs out over a flattened bottom blade and angled upper teeth or bits slit the sheet and then continue into the sheet. The sheet bends down and the angle formed by this bending as it relates to the teeth causes a stretching motion of the strip. Consequently, the strip is stretched more or less by the depth of the tooth penetrations. The amount of stretching achieved in this way is typically in the range of 20-25% and can be as much as 37%. Compared to the slit-and-stretch approach, the one step approach produces perforations (openings) that have a shape more like that of a triangle than a diamond. As with the separate slitting and stretching approach, the one step approach forms openings by (i) forming slits in a sheet of metal and (ii) stretching the slits in the direction of the metal's longitudinal axis, but does so in one step, rather than two.

A video control system including a camera 111, which is connected with a computer controller 113 running software, and an optional monitor 115, examines the holes or open area, and can learn (after parameters are input to the controller) whether the perforations are within specification. Although not shown, the camera preferably is movably mounted on a track and is made to traverse the sheet as the sheet is advanced. The camera preferably captures an entire row (transversely to the direction of travel) and more preferably a few adjacent rows within its field of view. The software checks the opening sizes and/or shapes (geometry) to determine whether the individual openings, or open area (actual or estimated or calculated), are within specification. A second camera can be placed between the punch and the stretcher with similar hardware and software to determine whether the initial punching is within specification. The calculation for determining whether the product is within spec is typically based on the light transmitted through the openings made by the punch. (Suitable software is commercially available from Media Cybernetics, Inc., Silver Spring, MD, under the IMAGE PRO brand.)

While shown with a single punch, multiple punches can be used to provide different perforation spacings, geometries, and/or depths. Two punches, for example, can be cycled in any desired order any number of strokes or cycles (such as the first punch alternating with the second, or punching twice as often, or half as often, or alternating by twos, and so on). Preferably, at least one press is indexed transversely back and forth so that adjacent rows made by that press are offset from each other. (As used herein, a "row" of perforations is preferably transverse to the length of the sheet, although it is possible to have the press angled with regard to the longitudinal direction of the sheet.)

The video control system performs an optical inspection of the expanded metal sheet product and determines whether the product is within specification. To alter the process to get on, return to, or change the specification, the advance of the sheet is altered by adjusting the servo motor (via the computer controller) to change the longitudinal spacing of the perforations. Alternatively, the stretcher is adjusted to increase or decrease the amount the perforated sheet is stretched. Both can be adjusted to further avoid nesting of adjacent layers and/or alignment of radially adjacent openings when the sheet is curled.

One method of providing a variable pitch is to gradually change the advancement of the sheet. For example, the spacing between rows can be gradually increased and then returned to the original value (e.g., with a 500 mil initial spacing, increasing by 1 mil up to 15 mils and then back to the initial spacing, like a saw tooth waveform; or the change can be sinusoidal or like a triangular waveform; or irregular). By having a variable pitch, the possibility of nesting can be greatly decreased. Another method of providing a variable pitch is to have the pitch vary as a function of the circumference defined by a given portion of the sheet in the rolled up filter, so that radially adjacent openings do not nest. This approach can be combined with the variable pitch approach by gradually making the change in pitch between areas on the expanded sheet corresponding to two radially-adjacent circumferential layers, e.g., the change can be made over from two to five press cycles. In this way, overstretching of the transition area between the two pitches can be avoided. For most transitions, overstretching is not a problem and thus a gradual variation in the pitch is not required.

The expanded metal sheet can be flattened by one or a pair 121 of rollers. The sheet need not be compressed to any significant degree, and preferably is not compressed to the extent that flattening would then tend to close up the openings. The video control system camera (or a second or third camera) can be located after the flattening step, in which case it should be appreciated that adjusting the degree of flattening, and the resulting closing of the openings, is an additional parameter than can be adjusted to achieve the desired open area. Flattening the burrs accomplishes two objectives. The burrs present areas of high frictional contact; the flattened expanded metal sheet can slide more easily against itself if rolled or curled. The increased surface area resulting from flattening allows for increased welding currents and a higher weld strength due to the increased area of contact. In addition to these benefits, as noted above, the flattening sizes the openings. The flattening per se does not substantially contribute to anti-nesting and thus for most applications, to avoid unnecessary cost, this additional processing step will not be used.

In the manufacture of a filter for automotive airbag inflators, one filter geometry is a cylinder having porous walls. To make such a device, and continuing with FIG. 1, the flattened expanded metal sheet is cut 123 into individual pieces 125 that can be placed overlapping another (flattened) expanded metal sheet 127, possibly having a different open area, and attached to each other via a welder 129 (preferably by electric welding). The joined composite sheet is then rolled into a cylinder 131 and the edge of the mesh secured to the cylinder by a welder 133. To produce the proper ID and OD (inner and outer diameters), the welded mesh cylinder 135 is placed into a female mold 137 optionally having a movable inner wall, and a mandrel 139 optionally expandable is inserted into the central bore of the cylinder. The desired ID and OD of the final filter is achieved by the combination of the mandrel, optionally expanding, and the mold, optionally contracting, to cold form the cylinder into the desired radial geometry and dimensions. Because this approach involves a substantial amount of welding of individual pieces, flattening can be of benefit since, as discussed above, stronger welds can be achieved when welding together two flattened pieces of expanded metal as opposed to two non-flattened pieces. Another option for the piece-welding approach is to use a constant pitch and simply rotate selected pieces (e.g., every other piece, every second piece, etc.) by 90° before the pieces are welded together. Again, because this approach involves substantial welding, flattening can be of benefit.

In the manufacture of these filters, formed from multiple wrappings of the flattened expanded metal sheet, no nesting of the perforations was observed. Reduced nesting and the elimination of burrs allows for more filter layers in a given radial distance. Accordingly, if the design requires a specified OD, a larger ID can be provided; and likewise a specified ID will result in a smaller OD and thus a smaller device in total. Nesting is also deleterious because the shift in alignment of the sheet due to nesting of radially adjacent openings may not render the filter end (cylinder top and/or bottom) dimensions out of spec, while nevertheless providing an open channel between adjacent filter layers. Even if openings in adjacent layers are almost aligned, the absence of burrs eliminates the tendency for the openings to align (the burr of one opening settling into the adjacent opening) and thus decrease the filtering capacity.

The weld strength of the flattened sheet is twice that achieved when the sheet was not flattened. Spot welding is typically automated through a machine in which the welding current is operator-adjusted. Setting a fixed current leads to inconsistent welds when a non-flattened expanded metal sheet is welded because the burr areas are not uniform and surface area of contact through which the weld current flows varies for each weld. When the expanded metal sheet is flattened, there is a larger surface area, and so a larger welding current can be used. It was found that doubling the welding current for welding a flattened expanded metal sheet resulted in a weld strength more than double the weld strength of a sheet with burrs, as well as a more consistent weld strength.

The filter described above is made from two expanded metal sheets rolled into a cylinder. During the rolling, one or more intermediate layers can be added so that the filter has multiple repeating layers, or different intermediate layers each at a different radial distance. For example, FIG. 2 depicts the end (or cross-section) of a rolled cylindrical filter wherein a first flattened expanded metal sheet 201 is joined to a second flattened expanded metal sheet 203 by a weld 205 and rolling is started from the first sheet. At a predetermined position or amount of rolling, a fabric 207 is inserted between the layers, and at a position radially outward from the predetermined position a metal screen 209 is inserted between the layers of metal sheet. The outermost layer of the metal sheet is attached to itself by a weld 211. The filter thus formed has multiple filtering layers of different materials.

FIG. 3A depicts an expanded metal sheet 301 having a portion 303 that has been perforated and expanded, and disposed between areas 305 that have not been perforated. When punching is resumed after a solid (unperforated) area it preferably begins gradually, with the first few punches preferably not perforating the sheet to avoid the tendency of the punch to cut the sheet in two when a solid area is present downstream of the area to be perforated. The sheet has long edges L formed by the original sheet, and short edges S where it has been cut as a portion from a larger sheet (such as shown in FIG. 1). Some airbag designs require the flow of the expanded gas (whether by explosion or a compressed gas, or combination thereof) to be directed in a particular direction. For example, a curtain-type airbag may require gas to be directed along a linear extent. Alternatively, the area in which the airbag assembly is installed may have only a portion available for fluid communication with the airbag. The sheet in FIG. 3A can be rolled up, using as its axis a line connecting the short sides. In this case, the long sides will be overlapped and welded to create a filter having the geometry shown in FIG. 3B, where the ends of the filter are unperforated and only the central section is perforated. Alternatively, the sheet can be rolled using as the axis a line connecting the long sides, which results in the geometry shown in FIG. 3C. Although sheet 301 is shown as having a single perforated section, multiple perforated sections, separated by unperforated sections, can be made (by not punching over those areas) to create a filter as shown in FIG. 3B but having two perforated bands separated by an unperforated area, as shown in FIG. 4A, as opposed to the single perforated band shown. It is apparent in view of the foregoing examples that various portions can be perforated or left unperforated, and the sheet cut and rolled to provide a tubular filter having perforations only at predetermined areas to direct the gas flow as desired.

The pattern of openings is determined by the arrangement of bits on the punch and the punch rate as a function of the linear travel of the sheet. Avoiding nesting can be accomplished by various modifications of this basic design. As noted above, multiple punches can be used having different arrangements of bits (for example, laterally offset from the other punch(es)). The rate of punching can be altered to provide an increasing distance between adjacent openings (the pitch), and then cycled back, as noted above. For instance, the travel of the sheet can be adjusted so that the pitch increases from the previously punched row by one mil until the separation is 15 mils, and then the process is reversed (decreasing each by one mil) or started from the beginning again. Given the specifications for a particular filter, the pitch can be varied as a function of the circumference defined by a given portion of the sheet in the rolled up filter, so that radially adjacent openings do not nest. Yet another method for preventing nesting is by indexing one or more punches transversely so that each row is offset laterally from the previous row. As with the other methods, the punch can be indexed back and forth by a fixed amount, or by a predetermined amount one way until a desired offset is achieved, and then back. For example, using the center-to-center distance (for the openings) in a given row, the next row can be indexed transversely 30% on the next punch, an additional 30% on the following punch, and so on, for a predetermined number of times, and then indexed back to the original position. Knowing the position of any portion of the sheet in the filter, as based on the filter specification, allows a straightforward calculation to determine how the openings need to be varied to avoid nesting radially adjacent openings. Any one or combination of these techniques can be used to reduce the possibility of nesting, including those described below.

Still another method to reduce nesting is to vary the size of the openings. Preferably, the size of the openings in any row can be varied by altering the punch depth, such as by varying the stop position of the punch every one, two, or desired number of punches. When two or more punches are used, each can be set at a different punch depth, and/or have bits of a different size than another punch, and/or have bits of a different geometry.

The expanded metal articles of this invention can be combined with wire winding. For example, a sheet perforated as desired is rolled onto a mandrel so that the ends abut, and then wire is wrapped around this perforated substrate in a desired pattern. The winding can reinforce the solid (unperforated) areas, provide a chamfered end, and/or partially cover the perforations. The wrapping of the wire avoids the need to weld the edges of the sheet. FIG. 4B shows the device in FIG. 4A having three separate areas 307 on which wire is wound. The wire increases the strength of the device in resisting the explosive force of the gas charge. One end is shown where the winding 309 provides the geometry of a chamfered end (or approximation of a chamfered end). The wire wound perforated sheet can be sintered or brazed to secure the wire wrapping. When wound over existing perforations, the winding can be used to further increase or tailor the effective opening space (that is, the resulting pressure drop) to a desired degree.

Although the above embodiments have been described with particular reference to filters for airbag assemblies, there are other uses for such an article, such as an electrode and to replace the Dutch weave used in woven airbag filters. As a thinner sheet is used in the beginning, smaller holes are possible, enabling the production of a "micro" expanded metal. Certain prior art perforated metal sheet filters employed a ceramic paper interlayer for additional filtering. Instead, the microexpanded metal sheet (thin enough to be considered a foil, less than 10 mils in thickness) can be used instead of ceramic paper. In most cases, the articles produced by this disclosure will be used for filtering.

B. Applications

In a typical application of the foregoing disclosure, the expanded metal sheet is rolled upon itself to produce a structure having multiple layers, e.g., between three and twenty layers. The first 360 degree wrap (first layer) can be secured with spot welds with the remaining layers being continuously wrapped around one another to reach the desired outside diameter. The outermost layer can then be secured with spot welds. For strength purposes, spot welds can be added to one or more of the internal circumferential layers of the filter. Such additional spot welds, however, are generally not required to achieve the strength levels needed for an airbag filter.

Figure 6:
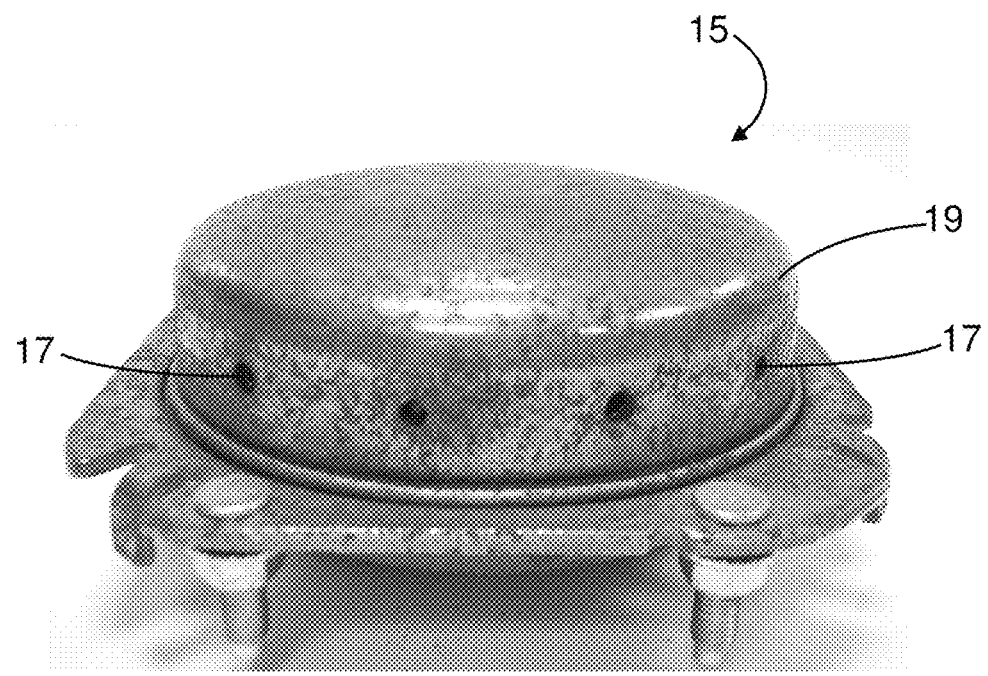
FIG. 6 is a photograph of an airbag inflator housing with which the expanded metal filters disclosed herein can be used.

FIG. 5 shows an airbag inflator filter 13 constructed in this way. FIG. 6 shows an example of an inflator housing 15 having an internal chamber in which filter 13 is inserted. The housing shown is for a steering wheel airbag and thus has an overall "pancake" shape suitable for mounting in a steering column. The housings for other types of airbags, e.g., curtain airbags, have somewhat different configurations and thus the configuration of filter 13 may be different for such airbags. Although the configuration may be different, the same basic non-nesting construction is used.

Figure 7:
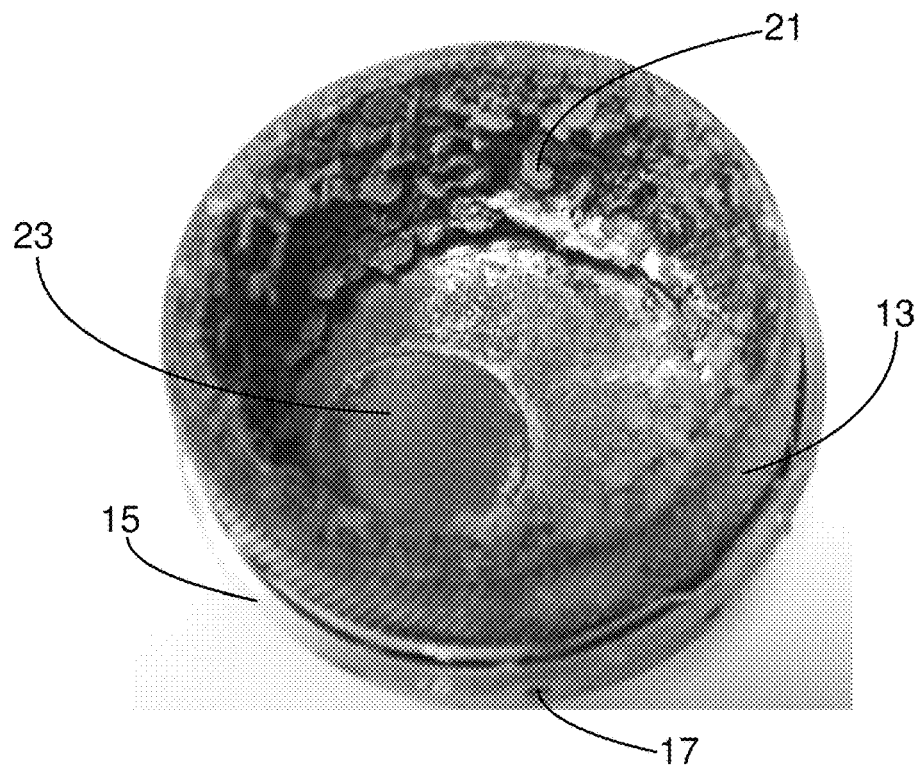
FIG. 7 is a photograph showing the internal chamber of the housing of FIG. 6 after deployment of the inflator's explosive.
Figure 8:
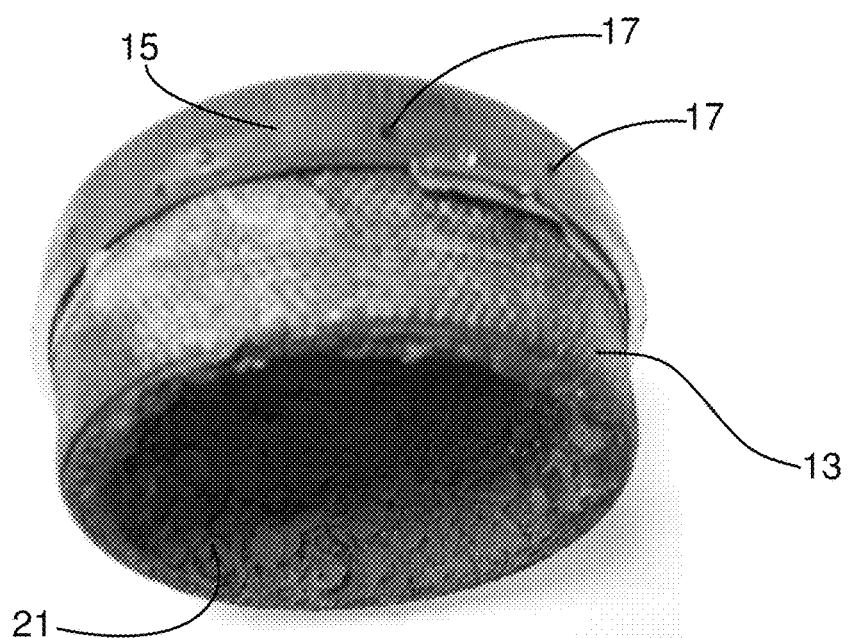
FIG. 8 is a photograph showing the internal chamber of the housing of FIG. 6 and the surface of the filter after deployment of the inflator's explosive.

As shown in FIG. 6, housing 15 includes a plurality of apertures 17 which allow gases produced by the inflator's explosive charge to exit the housing and inflate the air bag (not shown) which is secured about the outside of the housing. A typical explosive charge is based on ammonium nitrate and produces substantial amounts of particulate debris, known in the art as "slag." FIGS. 7 and 8 show the slag residue 21 captured on the inner diameter of filter 13 after a charge has been detonated. Reference number 23 in this figure shows the housing's igniter port which is used in detonating the main explosive charge which is located within the inside diameter of filter 13 prior to detonation. An examination of FIGS. 7 and 8 gives some feeling for the conditions under which filter 13 must operate. Comparing these figures with FIG. 5, which shows the filter prior to detonation, shows the extreme pressure and heat conditions to which the filter is exposed during use.

Figure 9:
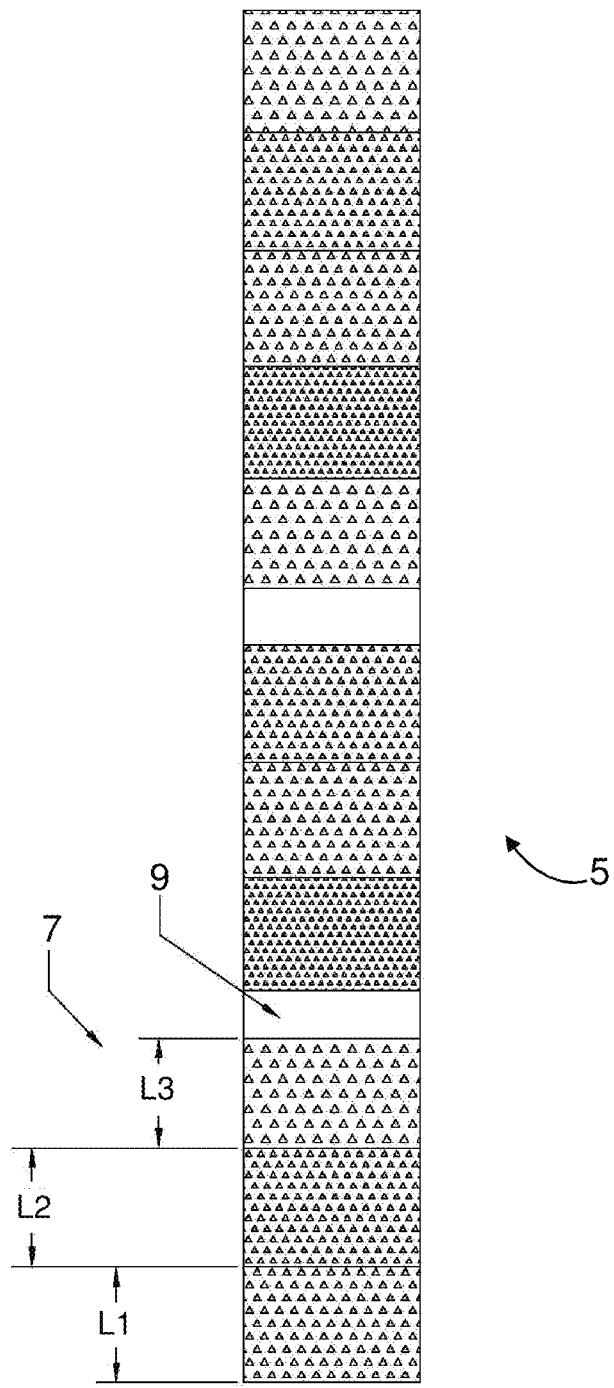
FIG. 9 is a schematic drawing illustrating representative features of an expanded metal strip having openings whose pitch and/or sizes vary along the length of the strip. This drawing is not to scale and the number of sections actually used can be greater or less than that shown in the figure.

In constructing filter 13, the opening or pitch or both along the length of the expanded metal sheet are normally changed at every circumferential wrap and the developed pattern shows an increased section length as the filter is wound in that the circumference increases at every additional layer of expanded metal. FIG. 9 schematically illustrates representative types of patterning that can be used along the length of expanded metal sheet 5, where reference number 7 represents a section of the expanded metal sheet which has a pitch and/or opening size selected to reduce nesting, and reference number 9 represents a non-perforated section (see discussion below). In addition to considerations of nesting, the hole sizes can also be selected based on desired gas flow behavior. Thus, larger openings can be used for the innermost layers of the filter, followed by finer, but non-clogging, openings, followed again by larger openings to achieve a diffusing effect at the outer surface of the filter. Other combinations can, of course, be used based on the specifics of the application.

Figure 10A:
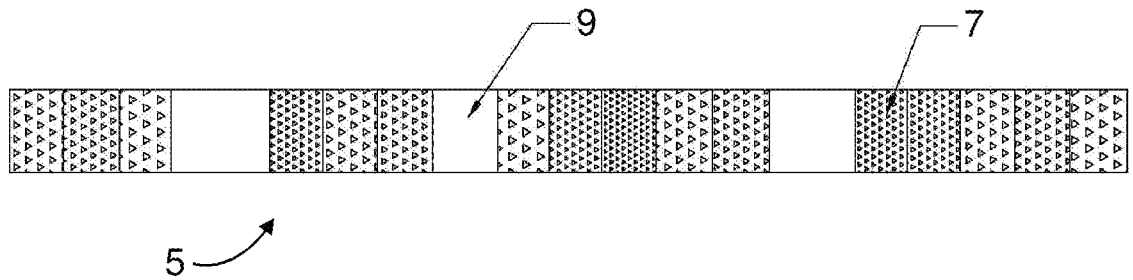
FIG. 10A is a schematic drawing illustrating representative features of an expanded metal strip having openings whose pitch and/or sizes vary along the length of the strip.

Lengths L1, L2, and L3 in FIG. 9 (as well as the lengths of the other sections shown in this figure and in FIG. 10A) will in general be different so as to take into account the increases in circumferential length associated with increasing radius. It should be noted that the section lengths in this figure and FIG. 10A are not drawn to scale, but are merely illustrative of the types of structures used to reduce nesting of the circumferential wraps. Also, the number of sections used in an actual filter can be more or less than the number shown in these figures.

By using the variable pitch and/or opening sizes, a variety of benefits can be achieved. For example, by using a fine pitch and/or a fine opening size, particle retention and overall performance can be optimized. More generally, by reducing/eliminating nesting, consistency is greatly improved, including substantial reductions in the standard deviation for flow through the filter, which is of primary importance to manufacturers of air bag systems.

C. Torturous Paths

FIG. 10 illustrates the use of non-perforated sections 9 to produce a torturous path for gas flow through the filter. These non-perforated sections or stripes in the perforation pattern result in a zigzag gas path in the assembled filter. Such a path is desirable for trapping particles generated by an airbag's explosive charge. In particular, each time the gas is forced to change direction, its velocity profile changes and this causes particles entrained in the gas stream to plate out and become trapped in the filter. One of the primary purposes of air bag inflator filters is to capture particles produced by the explosive charge and thus improvements in the particle capturing ability of filters is of importance to manufacturers of air bag systems.

Non-perforated sections 9 produce such changes in direction since the gas cannot pass through these sections but must travel along the section until it reaches the section's edge where it again must turn to find a path out of the filter. The non-perforated sections thus act as barriers to simple radial flow of gases through the filter.

Figure 10B:
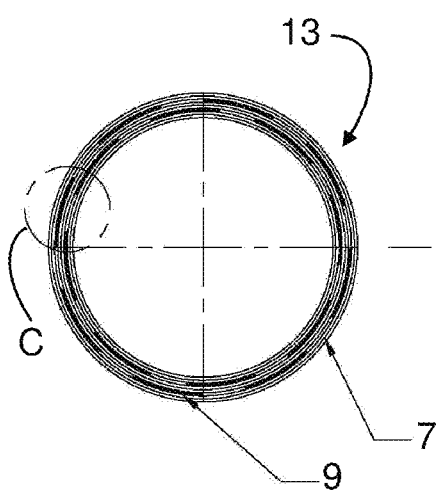
FIG. 10B is a schematic, cross-sectional view of a filter designed to produce a tortuous path for gases.
Figure 10C:
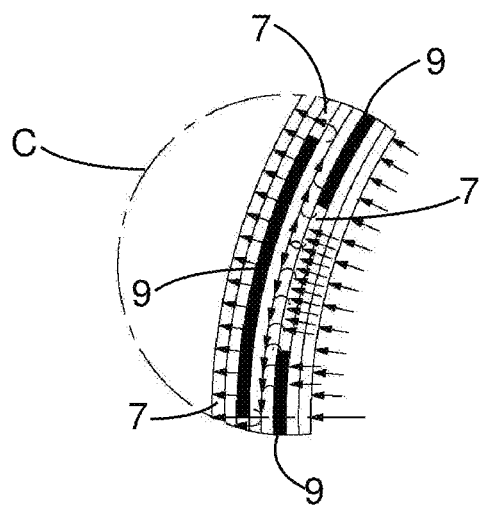
FIG. 10C is an enlarged cross-section view of the portion of the filter of FIG. 10B within circle C.
Figure 10D:
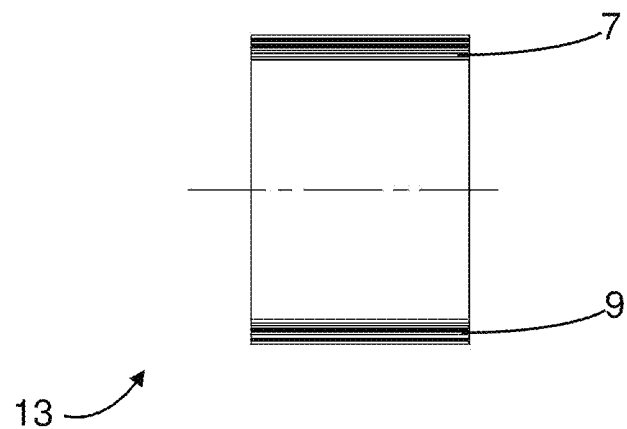
FIG. 10D is a cross-sectional view of the filter of FIG. 10B in a plane orthogonal to the plane of FIG. 10B.

This zigzagging is illustrated in FIG. 10, where FIG. 10C is an enlarged view of the portion of filter 13 within circle C of FIG. 10B. The arrows in FIG. 10C represent gas flow through the filter. As is evident, the gas flow path is highly complex with numerous changes in direction which assist in removing particles from the gas stream.

In FIG. 10, non-perforated sections 9 extend across the entire width of expanded metal sheet 5. If desired, the non-perforated sections can extend only partially across the width of the sheet, e.g., there can be a perforated region at one edge, at both edges, at one or more locations between the edges, or combinations thereof. For some applications, such more complex patterns can be helpful in balancing the need for particle retention with the need for low backpressure.

However deployed, the use of non-perforated sections causes the gas flow to include at least some circumferential flow within the body of the filter. The circumferential flow produced by the non-perforated sections is over distances greater than the average spacing between perforations, e.g., more than 5 times greater. In some embodiments, e.g., the embodiment illustrated in FIGS. 10B and 10D, substantially all possible flow paths from the inner diameter of the filter to its outer diameter includes both radial and at least some circumferential flow over a distance greater than the average distance between perforations.

It should be noted that not every layer of the filter need have non-perforated sections. Rather, some layers can exhibit primarily radial flow, e.g., the first few and last few layers, and others can be a combination of radial and substantial circumferential flow, e.g., the middle layers.

D. Circumferential Grooves

As illustrated in FIG. 6, housing 15 includes a plurality of apertures 17 through which the gases generated by the airbag's explosive charge exit the housing. Typically, these apertures are in a single transverse plane, although in some cases two rows of apertures in two transverse planes are used. As illustrated in FIGS. 6-8, the apertures, whether in one or more than one transverse plane, are typically not symmetrically located with respect to the housing's internal chamber which receives filter 13.

Because they are the only exit for the gases produced by the airbag's explosive charge, it is important that apertures 17 remain open throughout the airbag deployment. In practice, filters 13 and, in particular, the outer wraps of the filter, can expand as a result of the explosion taking place within the filter's inner diameter. Such expansion can reduce and/or close off the annular radial manifold space between the filter and the housing, including the space in the vicinity of apertures 17, thereby causing increased combustion pressure.

Through a series of experiments, it was found that a groove formed in the outer surface of the filter will substantially retain its shape during the explosion, notwithstanding the fact that the rest of the filter grows in size. These experiments included experiments under extreme conditions, i.e., experiments employing a maximum explosive charge and a filter temperature of 250° F. The 250° F. temperature was selected since it represents the maximum temperature likely to occur if a car is left in the sun for a substantial period of time. Testing under elevated temperature conditions was performed since the physical properties of metals, such as those used to form filter 13, degrade with increasing temperature.

Based on these experiments, it was concluded that the problem of reduced access to apertures 17 as a result of deformation of the filter by the pressures generated during detonation could be overcome by (i) including a circumferential groove 3 in the outer substantially cylindrical surface of the filter and (ii) ensuring that in the assembled housing, the groove is aligned with the circumferential ring of apertures 17.

As noted above, apertures 17 are typically offset from the midplane of the chamber in which the filter is received. Accordingly, if the filter were to have just one groove and if the filter were to be inserted in the cavity in the wrong orientation, access to apertures 17 could become compromised. To address this possibility, two grooves 3 are formed in the outer surface of filter 13 so that one of the grooves is aligned with the housing's apertures irrespective of the filter's orientation when inserted into the housing. As also noted above, some housings have more than one row of apertures. In such a case, multiple pairs of grooves 3 are formed in the outer surface of filter 13, with one groove being aligned with each row of apertures irrespective of the orientation of the filter when inserted in the housing. For example, if the housing has two closely spaced rows of apertures, the filter would have four grooves organized into two groups, with the spacing between the grooves of each group being smaller than the spacing between the groups.

Groove 3 can have various configurations and can be produced in various ways. In general terms, the groove should be wide enough so that it is over the apertures even if all of the tolerances, i.e., the accumulated or stacked tolerances, happen to be in one direction. In practice, grooves having arcuate cross sections have been found to resist higher pressures than those having V-shaped cross sections. Also, forming grooves in the expanded metal sheet prior to rolling the sheet on itself to form the filter has been found to produce a groove that is better able to withstand the detonation pressures than grooves formed in the outside surface of the filter after the rolling has been completed.

In addition to using grooves, filter expansion can also be reduced by increasing the tensile strength of the metal used to form the filter. The increased tensile strength increases the filter's hoop strength, thus minimizing the growth of the outer wraps of the filter.

Figure 11A:
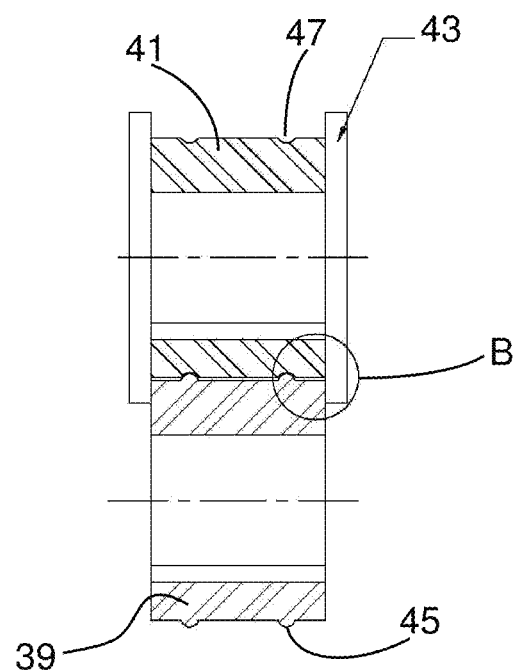
FIG. 11A is a schematic cross-section view of equipment suitable for producing a pair of grooves in a strip of metal.
Figure 11B:
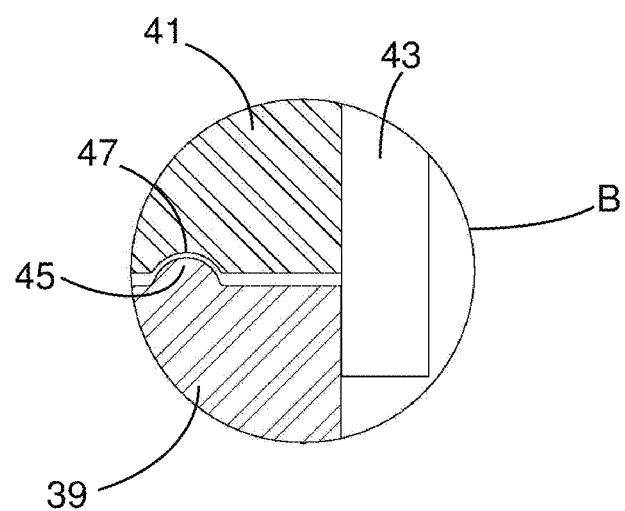
FIG. 11B is an enlarged cross-section view of the portion of the equipment of FIG. 11A within circle B.

FIG. 11 shows equipment that can be used to form grooves 3 in an expanded metal sheet as it is being wound into a filter. As shown therein, a first roller 41 includes recesses 47 and a second roller 39 includes protrusions 45. The expanded metal sheet is passed between the rollers with guides 43 serving to restrain the sheet from sidewise motion. Guides 43 also maintain the alignment between the rollers, e.g., roller 39 can be allowed to float in a transverse direction with guides 43 being used to trap the roller and align it with roller 41. Alternatively, a single pressure roller with the groove configuration can be forced pneumatically, hydraulically, or with a servo motor onto the surface of the filter as it is being wound thereby forcing the groove shape into the filter. As a further alternative, after the filter has been completely wound and welded, a contoured groove roller can be forced onto the substantially cylindrical face of the filter as it is rotated to form the groove. This latter approach, however, has been found to produce grooves which are less able to withstand the forces associated with detonation than the approaches in which the grooves are formed in the expanded metal sheet as it is being wound.

E. Rounded Corners

It has also been determined experimentally that applying a radius to the corners of the filter produces a substantially better seal of the filter in the inflator housing than either a sharp corner or a chamfered corner, where a better seal means one that reduces the maximum length of flame released from the housing when an inflator charge is ignited within the central bore of the filter. As known in the art, such flame length can be determined using high speed photography of an airbag housing during detonation.

Figure 12A:
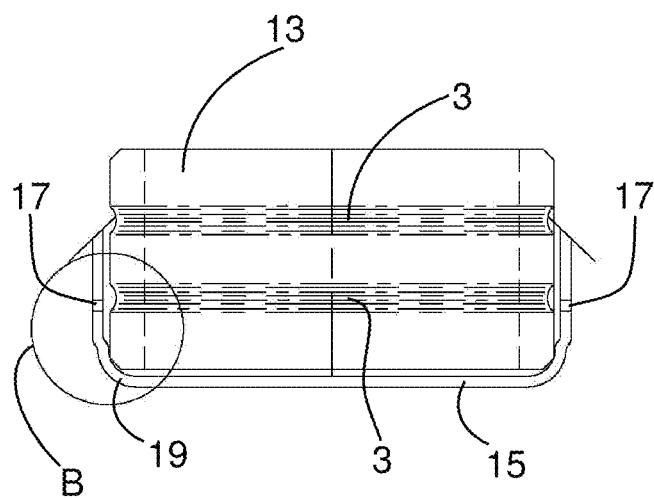
FIG. 12A is a schematic cross-section view of a filter and a portion of a housing for the filter where the filter has chamfered corners.
Figure 12B:
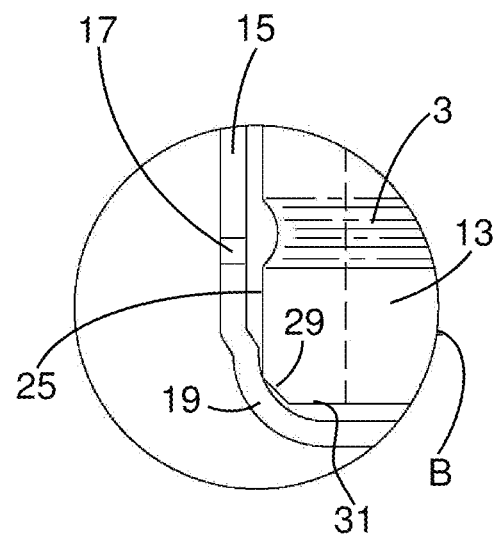
FIG. 12B is an enlarged cross-section view of the portion of the filter and housing of FIG. 12A within circle B.
Figure 13A:
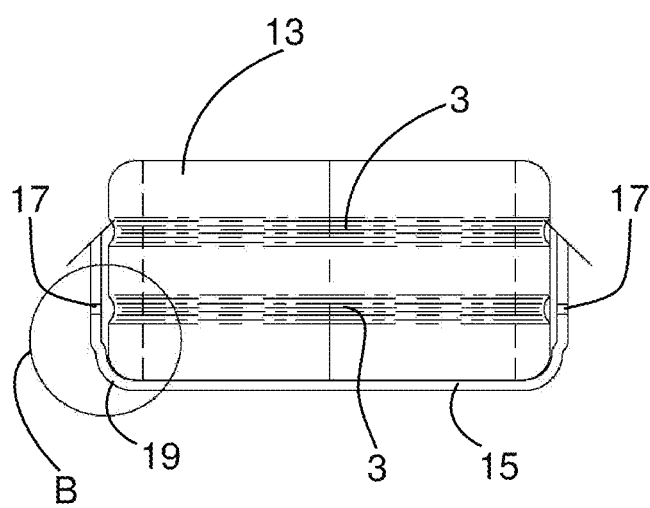
FIG. 13A is a schematic cross-section view of a filter and a portion of a housing for the filter where the filter has rounded corners.

As illustrated in FIGS. 6, 12, and 13, inflator housings typically have rounded corners (see reference number 19 in these figures). FIG. 12 shows the mating of a filter 13 having a chamfered corner 29 with rounded corner 19, while FIG. 13 shows the mating of a filter having a rounded corner 27. Before the experiments were performed, it was expected that the chamfered corner would perform better than the rounded corner because the point contacts associated with a chamfered corner were expected to produce deformation of the corner by point loading and thus a custom seal between the filter and the housing's wall as the filter was forced into the wall as the housing was assembled and then by the pressure generated by the explosive charge.

In practice, however, it was found that the rounded corner was substantially better than the chamfered corner. Thus, switching from the chamfered corner of FIG. 12 to the rounded corner of FIG. 13 produced a reduction of more than 25% in the maximum length of flame released from the housing when an inflator charge was ignited within the central bore of the filter. The chamfered corner was better than a square corner, but not as good as the rounded corner. Compared to a square corner, the rounded corner produced a reduction in the maximum length of the flame released from the housing substantially greater than 25%, e.g., a reduction greater than 50%. The rounded corner was also better than both the chamfered and square corners in particle retention.

In general terms, the mean radius of the filter's corner should be within ±10%, preferably, within ±5% of the mean inner radius of the housing. Also, the rounding of the corner needs to be performed using a point loading process. In particular, machining the radius is not suitable because of the low structural strength of the individual filter layers. Grinding is also not viable because grinding residue, both metallic and organic, will be deposited into the filter structure and will be difficult, if not impossible, to remove. Such grinding residue will be released when an airbag's explosive charge is detonated and thus will represent debris not captured by the filter. To form the radius in a single stroke in a coining or forming guide is not practical because the column strength of the filter is not adequate to support the substantial forces associated with such operations.

A point loading process overcomes the problems with these other approaches. Such a process densites the corner without metal removal, thus avoiding the debris problem associated with grinding. At any given time, the process only applies high forces to a small area of the circumference of the filter's edge, thus avoiding the problems associated with the strength characteristics of the filter.

Figure 14A:
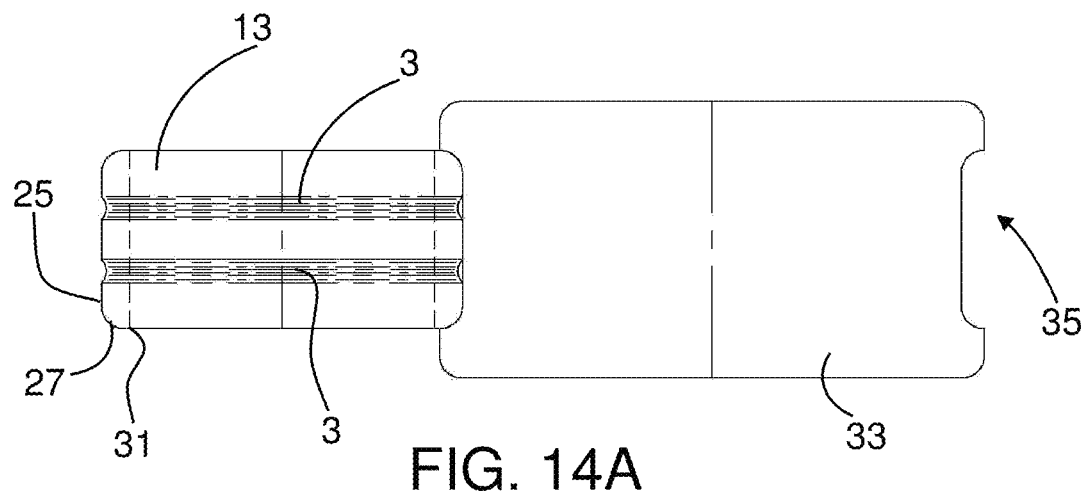
FIGS. 14A and 14B are schematic top and side views, respectively, illustrating the formation of rounded corners on a filter using a point loading process.

The point loading can be performed in a variety of ways. For example, as in an orbital riveting machine, one or more rotating shafts with the appropriate radius on their working surface can be applied to points on the corner of the filter and moved along the corner's circumference to generate the rounded corner. Alternatively, a device of the type shown in FIG. 14 can be used.

Figure 13B:
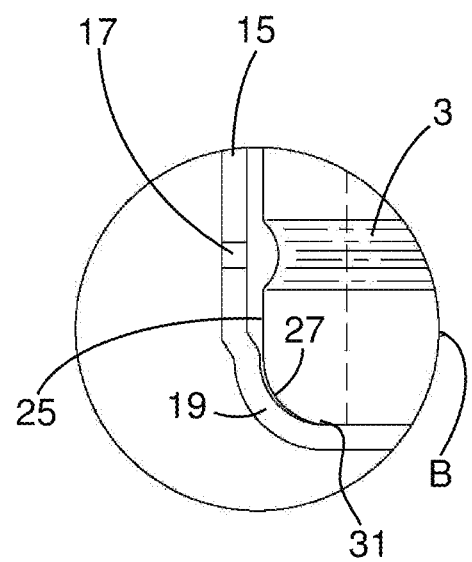
FIG. 13B is an enlarged cross-section view of the portion of the filter and housing of FIG. 13A within circle B.
Figure 14B:
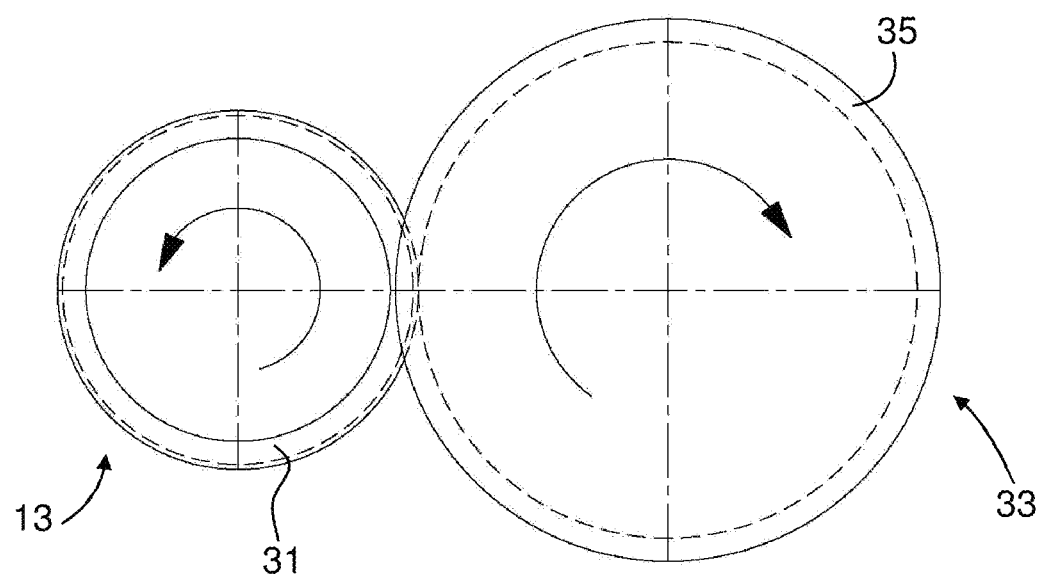

In this system, both roller 33 and filter 13 rotate, as indicated by the curved arrows in FIG. 14B. In particular, filter 13 is driven at relatively high speed and roller 33 is brought into contact with the filter and rotates in the opposite direction from the filter as a result of frictional engagement with the filter. Filter 13 fits within aperture 35 of roller 33 and as shown most clearly in FIG. 14B, the aperture and the filter only make contact along the single line where they meet. Accordingly, the force applied between the filter and roller 33 to bring them into engagement is only applied to the two corners of the filter at the opposite ends of this line of contact, i.e., the filter's corners are deformed by point loading. The radii of the corners of aperture 35 match those of the housing within ±10% (preferably, ±5%) and thus, as illustrated in FIG. 13B, the result of the point loading is to produce a filter corner 27 between the filter's substantially cylindrical outer surface 25 and its substantially flat end section 31 which closely matches the inside radius of the housing's corner 19.

F. Texturization

As discussed above, one of the purposes of airbag inflator filters is to capture debris (particles) generated by the detonation of the inflator's explosive charge. As also discussed above, particles tend to be caught by the filter when the gases flowing through the filter are undergoing a change in direction. Laminar flow is the antithesis of a flow in which gases change direction. To minimize the occurrence of such flow, the surface of the expanded metal making up the filter can be texturized. Such texturization can be performed on the metal sheet before it is perforated (expanded) or after, with pre-texturization being the more typical approach.

By texturizing the metal surface, a relatively flat planer surface is transformed into a series of thousands of hills and valleys, thus increasing the surface area of the sheet by upwards of 20%. Having this additional surface area at the boundary over which the hot gases pass dramatically increases the filtering efficiency of the filter. In addition to improving filtering, a texturized surface increases thermal heat transfer to the filter. As discussed above, cooling the gases produced by an airbag's explosive charge before they reach the airbag is one of the functions of airbag filters.

Although not wishing to be bound by any particular theory of operation, it is believed that both the increased filtering efficiency and the increased cooling of the explosive gases is due to the generation of turbulent flow with high Reynolds numbers at the texturized surface. Such turbulent flow is dominated by internal forces which tend to produce random eddies, vortices, and other flow fluctuations. These random eddies, vortices, and flow fluctuations keep the gases in contact with the filter surfaces longer, thereby depositing more particles onto, and exchanging more heat energy with, the filter.

With regard to capturing particles, it is also believed that the peaks and valleys of a texturized surface which are perpendicular to the direction of gas flow contribute to the additional particle removal and, in particular, to the removal of fine particles. These peaks and valleys provide a mechanism for tenaciously arresting and removing particles from the gas stream.

Because the gases come into contact with both sides of the metal strip or strips making up the filter, the texturization is preferably on both sides of the strip(s), although texturization on one side can be used if desired. The texturization can be performed in various ways known in the art. One of the more efficient ways is to pass the strip(s) through embossing rollers having a pattern engraved in their surface. The pattern on the rollers can be formed in a number of ways known in the art, including by hand, laser etching, EDM, hobbing, or combinations thereof. As alternatives to the use of embossing rollers, lasers, acid etching, knurling, sandblasting (e.g., with a centrifugal blasting device), or combinations thereof can be used to directly texturize the surfaces of the strip. However formed, the linear feature density D of the texturized surface can be in the range of 15-500 features/inch, with the feature amplitude being no greater than $0.5/D$.

Figure 15:
FIG. 15 is a photograph of the surface of a roller for use in forming a metal strip having a texturized surface.

FIG. 15 is a photograph of the surface of an embossing roll having a texturization pattern 37 formed therein that can be used to texturize metal strip(s) used to produce airbag filters. The U.S. penny in this figure shows the scale of the types of patterns that can be used. As shown in this figure, the overall pattern is a checkerboard with the grooves in each block at right angles to those of adjacent blocks. When transferred to a metal strip, a pattern of this type will significantly reduce the ability of a gas to exhibit laminar flow as it passes over the strip's surface. The pattern is also able to grab particles from the gas stream even with fluctuating flow paths.

G. Coated Metals (e.g., Plated Metals)

As discussed above, in airbag inflator systems, in addition to capturing particles, filters are also utilized to cool the expanding hot gases from the pyrotechnic deployment. The cooling ability of the filter has a tremendous influence on the performance of the inflator.

By forming the filter out of one or more expanded metal strips that comprise a first metal having at least one surface coated with a second metal whose conductivity is greater than the first metal, e.g., at least 25% greater, additional heat transfer from the expanding gases to the filter can be achieved beyond that provided by the first metal alone. As used herein, the word "metal" includes pure metals and metal alloys.

During deployment, thermal heat energy is transferred to the filter by convection. Because the entire deployment of the inflator's explosive takes only about 20 milliseconds, the time available for convective transfer is short. Accordingly, there is a tremendous advantage in having a highly thermally conductive outer layer at the boundary between the filter and the hot gases. Because of its higher thermal conductivity, even a thin layer of the second metal such as that produced by plating will enhance both the local transfer of heat to the filter and the distribution of the heat throughout the body of the filter.

A variety of metals can be used for the first and second metals. For example, the first metal can be a carbon steel and the second metal can be tin or a tin alloy. Mild steel has a thermal conductivity in the range of ~26 W/mK to ~38 W/mK, while pure tin's thermal conductivity is ~64 W/mK. As noted above, an overriding consideration when manufacturing mass-produced items for the automotive industry is cost. Because of its use in the canning industry, tin-plated carbon steel sheet is readily available. Although it is somewhat more expensive than non-plated materials, the thermal efficiencies accrued by utilizing tin-plated expanded metal allow the overall mass of the filter to be reduced which can more than compensate for the slight increase in cost of the tin-plated carbon steel.

In addition to the foregoing considerations, there is sometimes a need to protect the filter from corrosion prior to the time it is used, which may be many years after it is installed. There are two filter locations used in pyrotechnic inflators. In the first, the filter is inside a hermetically sealed chamber with the propellant. In the second, the filter is outside the hermetically sealed chamber and thus is exposed to the atmosphere where it can rust or become corroded. In the past, the problem of corrosion has been dealt with by using stainless steel to construct the filter or by performing a thermal bluing operation on the finished filter similar to the bluing on firearms. Such bluing forms an oxide on the filter's metal surface which retards rusting.

An advantage of tin-plated carbon steel as it relates to filters made from expanded metal sheets is the material's natural corrosion resistance. Although in most cases the steel sheet will be plated before the expanding operation takes place, thereby leaving the pierced and expanded holes somewhat unprotected, the majority of the sheet is still covered with the tin plating. Also, experimental studies have shown that the piercing tooling drags some of the tin plating into the openings during the expanding operation and although the openings do not exhibit the same corrosion resistance as the surfaces of the sheet there is still an increase in protection in the openings.

The foregoing description is meant to be illustrative and not limiting. Various changes, modifications, and additions may become apparent to the skilled artisan upon a perusal of this specification, and such are meant to be within the scope and spirit of the invention as defined by the claims.

For example, although filters that comprise at least one strip of expanded metal having a variable perforation pattern along its length (i.e., variations in pitch and/or opening size) are preferred (e.g., because of their higher consistency in airbag filling and lower levels of out-of-roundness as formed), various aspects of the disclosure can be practiced in connection with filters produced by welding together pieces of expanded metal having different perforation patterns which are uniform throughout the length of each piece. In particular and without limitation, the torturous path, circumferential groove, rounded corners, texturization, and coated metal aspects of the disclosure can be used in connection with this latter approach for making expanded metal filters and the claims set forth below directed to these aspects of the disclosure are intended to cover both approaches for making expanded metal filters, as well as other approaches now known or subsequently developed.

What is claimed is:

1. A tubular filter comprising an expanded metal sheet, the expanded metal sheet having a multiplicity of rows of openings arranged to reduce nesting when the sheet is rolled on itself, the sheet rolled into a tube, and welded to fix the tubular orientation, wherein:
   (i) the expanded metal sheet is formed as one piece rather than being formed from multiple pieces of expanded metal that have been welded together at overlap regions;
   (ii) the rolled up expanded metal sheet comprises layers of expanded metal that are in an overlying relation with contact between the layers; and
   (iii) the pitch of the rows of openings is varied as a function of the circumference defined by a given portion of the expanded metal sheet in the rolled up filter so that radially adjacent openings do not nest.

2. The tubular filter of claim 1 wherein the filter is an automotive airbag filter.

3. An inflator of an airbag device comprising the tubular filter of claim 1.

4. The tubular filter of claim 1 wherein the expanded metal sheet is flattened.

5. A filter assembly comprising:
   (a) tubular filter of claim 1; and
   (b) at least one wire winding;
   wherein:
   (i) the tubular filter has an outer circumferential surface;
   (ii) the at least one wire winding is around the tubular filter's outer circumferential surface; and
   (iii) the at least one wire winding increases the strength of the filter assembly in resisting an explosive force of a gas discharge.

6. A filter comprising a cylindrical body wherein an expanded metal sheet in which a multiplicity of openings are formed is rolled into a cylindrical shape having multiple layers, the filter being characterized in that:
(i) the rolled up expanded metal sheet comprises layers of expanded metal that are in an overlying relation with contact between the layers;
(ii) the openings are arranged in rows and the pitch of the rows of openings is varied as a function of the circumference defined by a given portion of the expanded metal sheet in the rolled up filter so that radially adjacent openings do not nest, and
(iii) the expanded metal sheet is formed as one piece rather than being formed from multiple pieces of expanded metal that have been welded together at overlap regions.

7. An inflator of an airbag device comprising the filter of claim 6.

8. The filter of claim 6 wherein the filter is an automotive airbag filter.

9. The filter of claim 6 wherein the expanded metal sheet is flattened.

10. A filter assembly comprising:
(a) the filter of claim 6; and
(b) at least one wire winding;
wherein:
(i) the filter has an outer circumferential surface;
(ii) the at least one wire winding is around the filter's outer circumferential surface; and
(iii) the at least one wire winding increases the strength of the filter assembly in resisting an explosive force of a gas discharge.

11. A filter comprising a rolled expanded metal sheet having openings arranged in rows wherein:
(i) the expanded metal sheet is formed as one piece rather than being formed from multiple pieces of expanded metal that have been welded together at overlap regions;
(ii) the rolled expanded metal sheet comprises layers of expanded metal that are in an overlying relation with contact between the layers; and
(iii) the pitch of the rows of openings is varied as a function of the circumference defined by a given portion of the expanded metal sheet in the rolled up filter so that radially adjacent openings do not nest.

12. An inflator of an airbag device comprising the filter of claim 11.

13. The filter of claim 11 wherein the filter is an automotive airbag filter.

14. The filter of claim 11 wherein the expanded metal sheet is flattened.

15. A filter assembly comprising:
(a) the filter of claim 11; and
(b) at least one wire winding;
wherein:
(i) the filter has an outer circumferential surface;
(ii) the at least one wire winding is around the filter's outer circumferential surface; and
(iii) the at least one wire winding increases the strength of the filter assembly in resisting an explosive force of a gas discharge.

* * * * *

UNITED STATES PATENT AND TRADEMARK OFFICE
CERTIFICATE OF CORRECTION

PATENT NO. : 10,717,032 B2  
APPLICATION NO. : 12/407204  
DATED : July 21, 2020  
INVENTOR(S) : George Greenwood Page 1 of 1

It is certified that error appears in the above-identified patent and that said Letters Patent is hereby corrected as shown below:

On the Title Page

In Item (12):  
"Greenwood et al."  
Should read:  
--Greenwood--

In Item (75):  
"Inventors: George Greenwood, Tiverton, RI (US);  
  Michael McCarthy, Lincoln, RI (US);  
  Richard Pfefferle, North Smithfield, RI (US)"  
Should read:  
--Inventor: George Greenwood, Tiverton, RI (US)--

In the Specification

At Column 15, Line 46:  
"densities"  
Should read:  
--densifies--

In the Claims

At Column 18, Line 57, Claim 5:  
"tubular filter"  
Should read:  
--the tubular filter--

Signed and Sealed this  
Third Day of November, 2020

Andrei Iancu  
*Director of the United States Patent and Trademark Office*